United States Patent
Sinha et al.

(10) Patent No.: US 11,928,691 B2
(45) Date of Patent: Mar. 12, 2024

(54) METHOD AND SYSTEM FOR MANAGING WARRANTY CLAIMS ASSOCIATED WITH INFORMATION HANDLING SYSTEMS

(71) Applicant: Dell Products L.P., Round Rock, TX (US)

(72) Inventors: Prasoon Kumar Sinha, Bangalore (IN); K N Ravishankar, Bangalore (IN); Smruti Ranjan Debata, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 281 days.

(21) Appl. No.: 17/386,398

(22) Filed: Jul. 27, 2021

(65) Prior Publication Data

US 2022/0398597 A1    Dec. 15, 2022

(30) Foreign Application Priority Data

Jun. 11, 2021    (IN) .............................. 202111026096

(51) Int. Cl.
*G06F 16/23*    (2019.01)
*G06F 11/30*    (2006.01)
(Continued)

(52) U.S. Cl.
CPC ....... *G06Q 30/012* (2013.01); *G06F 11/3058* (2013.01); *G06F 11/3079* (2013.01);
(Continued)

(58) Field of Classification Search
CPC .............. G06Q 30/012; G06Q 2220/00; G06F 11/3058; G06F 11/3079; G06F 16/2379;
(Continued)

(56) References Cited

U.S. PATENT DOCUMENTS 6,473,607 B1 * 10/2002 Shohara ............ H04W 52/0293
455/208
6,598,003 B1 *  7/2003 Heino ................ G01R 19/2513
702/68

(Continued)

FOREIGN PATENT DOCUMENTS

WO    WO-2017147045 A1 *  8/2017 ......... G06F 16/2322

*Primary Examiner* — Hicham Skhoun
(74) *Attorney, Agent, or Firm* — Chamberlain, Hrdlicka, White, Williams & Aughtry; Aly Z. Dossa

(57) ABSTRACT

Techniques described herein relate to a method for deploying workflows with data management services. The method may include identifying, by a warranty measuring model associated with an information handling system, a first change event associated with the information handling system; obtaining first change information associated with the first change event; making a first determination that the first change event is not associated with an entry of a warranty audit table (WAT); generating a new WAT entry in the WAT using the first change information and an initial timestamp; identifying, by a warranty measuring model, a second change event associated with the information handling system; obtaining second change information associated with the second change event; making a second determination that the second change event is associated with an existing WAT entry of the WAT; updating the existing WAT entry using the second change information and a final timestamp.

20 Claims, 8 Drawing Sheets

(51) Int. Cl.
  *G06F 21/60* (2013.01)
  *G06F 21/64* (2013.01)
  *G06Q 30/012* (2023.01)

(52) U.S. Cl.
  CPC ........ *G06F 16/2379* (2019.01); *G06F 21/602* (2013.01); *G06F 21/64* (2013.01); *G06F 2201/835* (2013.01); *G06F 2201/86* (2013.01); *G06Q 2220/00* (2013.01)

(58) Field of Classification Search
  CPC .. G06F 21/602; G06F 21/64; G06F 2201/835; G06F 2201/86; G06F 21/6209
  USPC .......................................................... 707/748
  See application file for complete search history.

(56) References Cited

U.S. PATENT DOCUMENTS

| | | | | |
|---|---|---|---|---|
| 8,442,844 B1* | 5/2013 | Trandal | ................ | G06Q 30/012 705/35 |
| 10,156,987 B1* | 12/2018 | Gutierrez | ................ | G06F 1/206 |
| 11,451,068 B1* | 9/2022 | Nachman | ............ | H02J 7/00308 |
| 2003/0187885 A1* | 10/2003 | Miyazaki | ................ | G06F 16/10 707/999.203 |
| 2004/0128101 A1* | 7/2004 | Hermerding, II | ........ | G01K 7/42 374/E7.042 |
| 2009/0204232 A1* | 8/2009 | Guru | ...................... | G06Q 50/04 700/12 |
| 2009/0234512 A1* | 9/2009 | Ewing | ................... | G05B 15/02 700/295 |
| 2010/0074297 A1* | 3/2010 | Lawless | ................... | G01K 3/04 374/104 |
| 2012/0272086 A1* | 10/2012 | Anderson | ............... | G06F 1/206 713/340 |
| 2013/0198574 A1* | 8/2013 | Higley | ................ | G06F 11/0727 714/45 |
| 2014/0298113 A1* | 10/2014 | Sakurai | ............... | G06F 11/2025 714/47.3 |
| 2014/0366042 A1* | 12/2014 | Chan | ..................... | G06F 1/3212 719/318 |
| 2016/0274629 A1* | 9/2016 | Lovicott | ................ | G06F 1/206 |
| 2017/0221069 A1* | 8/2017 | Remboski | ............ | G07C 5/0825 |
| 2019/0251489 A1* | 8/2019 | Berti | ................ | G06Q 10/0631 |
| 2020/0133257 A1* | 4/2020 | Cella | .................. | G05B 19/4183 |
| 2020/0192779 A1* | 6/2020 | Minja | .................. | G06F 11/3476 |
| 2021/0110402 A1* | 4/2021 | Boaz | ..................... | G16Y 40/10 |
| 2021/0173757 A1* | 6/2021 | O'Donnell | .......... | G06F 11/3075 |
| 2022/0197355 A1* | 6/2022 | Choi | ..................... | G06F 11/3058 |
| 2022/0237094 A1* | 7/2022 | Sheperek | ............... | G06F 3/0634 |
| 2022/0319589 A1* | 10/2022 | Nowell | ............... | G11C 11/5642 |
| 2022/0365821 A1* | 11/2022 | Darji | ....................... | G06F 21/64 |
| 2022/0391916 A1* | 12/2022 | Varia | .................. | G06Q 30/0207 |
| 2023/0182575 A1* | 6/2023 | Kim | ....................... | G06Q 40/08 701/22 |

* cited by examiner

| Example Warranty Audit Table 310 ||||||
|---|---|---|---|---|---|
| Change 312 | Change Identifier 314 | Event 316 | Initial Timestamp 318 | Final Timestamp 320 | Log Information 322 |
| Disk A (Slot A) 324 | Change Identifier A 326 | Component Change 328 | 03-20-2021 09:00:00 330 | 03-20-2021 10:00:00 332 | Supported and Functional Component 334 |
| Disk B (Slot B) 336 | Change Identifier B 338 | Component Change 340 | 03-20-2021 10:00:00 342 | 03-20-2021 11:00:00 344 | Unsupported and Functional Component 346 |
| Graphics Processing Unit (Slot C) 348 | Change Identifier C 350 | Component Change 352 | 03-20-2021 11:00:00 354 | Not Recorded 356 | Undetected Component 358 |
| System Inlet Temperature 360 | Change Identifier D 362 | Temperature Change 364 | 03-20-2021 12:00:00 366 | 03-20-2021 13:00:00 368 | Temperature Above Threshold 370 |
| System Outlet Temperature 372 | Change Identifier E 374 | Temperature Change 376 | 03-20-2021 13:00:00 378 | 03-20-2021 14:00:00 380 | Temperature Below Threshold 382 |

FIG. 3B

Example Exportable WAT Data 311

| Time 313 | Disk A (Slot A) 315 | Disk B (Slot B) 317 | Graphics Processing Unit (Slot C) 319 | System Inlet Temperature 321 | System Outlet Temperature 323 |
|---|---|---|---|---|---|
| 03-20-2021 13:00:00-14:00:00 336 | | | | | ░░░ |
| 03-20-2021 12:00:00-13:00:00 333 | | | ▨▨▨ | ▨▨▨ | |
| 03-20-2021 11:00:00-12:00:00 331 | | | ▨▨▨ | | |
| 03-20-2021 10:00:00-11:00:00 329 | | ▦▦▦ | | | |
| 03-20-2021 09:00:00-10:00:00 327 | ▨▨▨ | | | | |
| 03-20-2021 08:00:00-09:00:00 325 | | | | | |

FIG. 3C

METHOD AND SYSTEM FOR MANAGING WARRANTY CLAIMS ASSOCIATED WITH INFORMATION HANDLING SYSTEMS

BACKGROUND

Computing devices may include functionality to process information in order to provide services. To provide the services, the computing devices may include hardware components and software components. The hardware and software components of the computing devices may occasionally be changed (e.g., by an entity that purchased the information handling system). The changes to the components may be relevant to a warranty associated with the computing devices.

SUMMARY

In general, certain embodiments described herein relate to a method for managing warranty claims associated with information handling systems. The method may include identifying, by a warranty measuring model associated with an information handling system, a first change event associated with the information handling system; in response to identifying the first change event: obtaining first change information associated with the first change event; making a first determination that the first change event is not associated with an entry of a warranty audit table (WAT); and in response to the first determination: generating a new WAT entry in the WAT using the first change information and an initial timestamp; identifying, by a warranty measuring model, a second change event associated with the information handling system; in response to identifying the second change event: obtaining second change information associated with the second change event; making a second determination that the second change event is associated with an existing WAT entry of the WAT; and in response to the second determination: updating the existing WAT entry using the second change information and a final timestamp.

In general, certain embodiments described herein relate to a non-transitory computer readable medium that includes computer readable program code, which when executed by a computer processor enables the computer processor to perform a method for managing warranty claims associated with information handling systems. The method may include identifying, by a warranty measuring model associated with an information handling system, a first change event associated with the information handling system; in response to identifying the first change event: obtaining first change information associated with the first change event; making a first determination that the first change event is not associated with an entry of a warranty audit table (WAT); and in response to the first determination: generating a new WAT entry in the WAT using the first change information and an initial timestamp; identifying, by a warranty measuring model, a second change event associated with the information handling system; in response to identifying the second change event: obtaining second change information associated with the second change event; making a second determination that the second change event is associated with an existing WAT entry of the WAT; and in response to the second determination: updating the existing WAT entry using the second change information and a final timestamp.

In general, certain embodiments described herein relate to a system for managing warranty claims associated with information handling systems. The system may include more than one information handling systems. The system may also include a warranty measuring model of an information handling system of the information handling systems, comprising a processor and memory, and configured to identify a first change event associated with the information handling system; in response to identifying the first change event: obtain first change information associated with the first change event; make a first determination that the first change event is not associated with an entry of a warranty audit table (WAT); and in response to the first determination: generate a new WAT entry in the WAT using the first change information and an initial timestamp; identify a second change event associated with the information handling system; in response to identifying the second change event: obtain second change information associated with the second change event; make a second determination that the second change event is associated with an existing WAT entry of the WAT; and in response to the second determination: update the existing WAT entry using the second change information and a final timestamp.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 3A-3C show an example in accordance with one or more embodiments of the invention.

DETAILED DESCRIPTION

Figure 1:
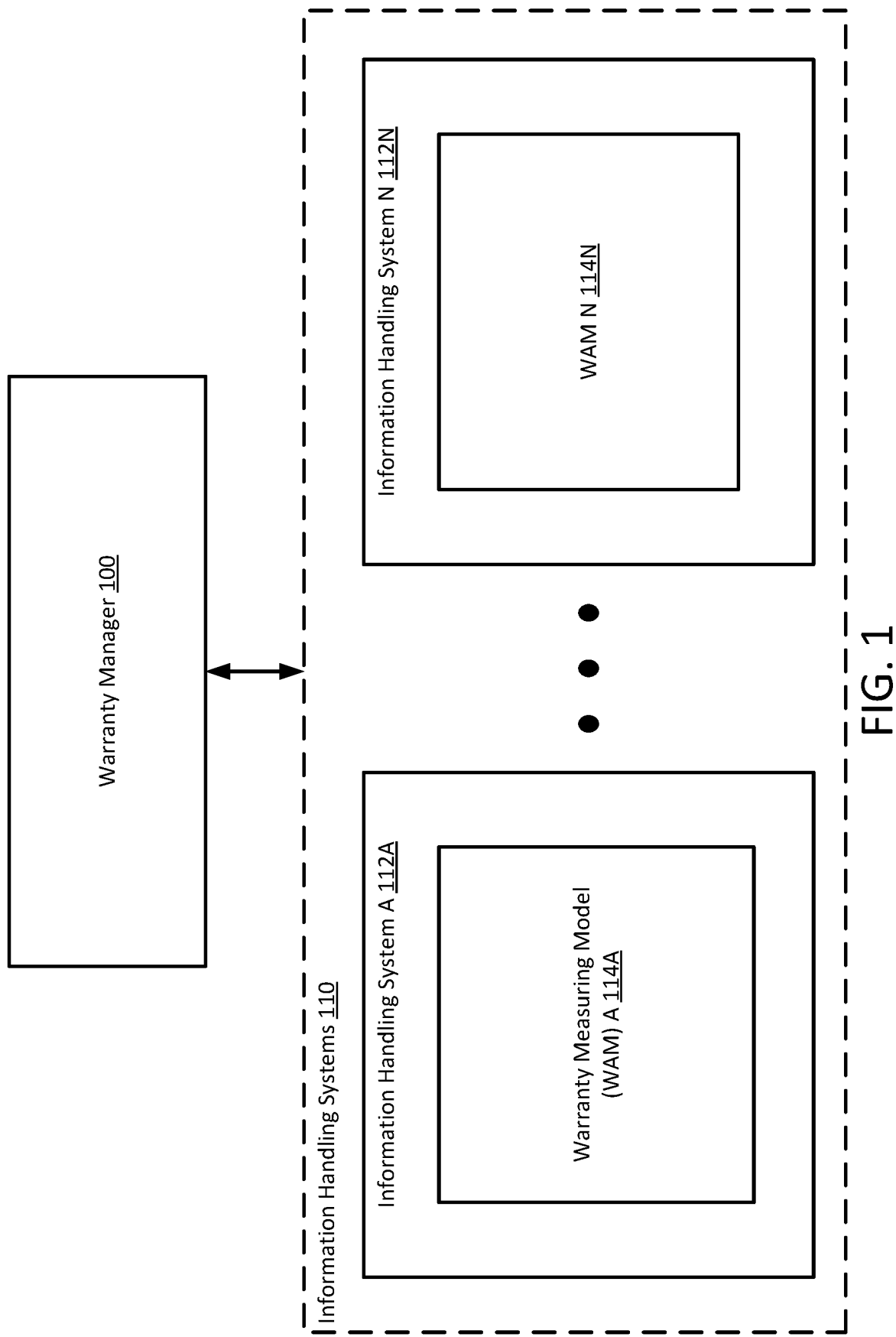
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments of the invention relate to methods, systems, and non-transitory computer readable mediums for obtaining information relevant to managing warranty claims associated with information handling systems.

In one or more embodiments, events may occur related to information handling systems being used by entities that purchased or otherwise obtained such systems. Such events may relate to the configuration (e.g., hardware and/or software configuration) of the information handling system, physical conditions of the information handling system (e.g., temperature), etc. Such events may be referred to herein as changes to an information handling system. In one or more embodiments of the invention, an information handling system's configuration may be changed by users, where such changes may impact the acceptance or rejection of one or more warranty claims made pursuant to a warranty associated with the information handling system. In one or more embodiments, an information handling system may experience conditions (e.g., thermal conditions) that affect warranty claims made pursuant to the warranty associated with the information handling system.

In one or more embodiments of the invention, information associated with the changes made to information handling systems, or other conditions experienced by the information handling system, may be modified, deleted, and/or otherwise tampered with by users in such a way that may interfere with properly assessing warranty claims.

To address, at least in part, the aforementioned problems that may arise when assessing warranty claims, in one or more embodiments of the invention, a warranty measuring model (WAM), executes (e.g., as a daemon thread on a processor or hardware controller) on an information handling system to generate and/or update a warranty audit table (WAT) that securely tracks changes to the information handling system on which the WAM is deployed.

In one or more embodiments of the invention, the WAM, upon request from a warranty manager, generates exportable WAT data, based on the WAT, and provides the exportable WAT data to a warranty manager. As an example, in one or more embodiments of the invention, the exportable WAT data may be image data configured to be efficiently processed by an image processing engine of the warranty manager. In one or more embodiments of the invention, the warranty manager performs warranty claim assessment actions based on the exportable WAT data, resulting in an efficient, secure, and reliable assessment of warranty claims. Such actions may include, for example, rejecting warranty claims, accepting warranty claims, requesting additional information, notifying a user of the warranty manager of changes, waiting for input from a user, etc.

FIG. 1 shows a diagram of a system in accordance with one or more embodiments of the invention. The system may include a warranty manager (100) and information handling systems (110). The information handling systems may include any quantity of information handling systems without departing from the invention. For example, the information handling systems may include information handling system A (112A) and information handling system N (112N). Each information handling system (112A, 112N) may include a warranty measuring model (WAM). For example, information handling system A (112A) may include WAM A (114A) and information handling system N (112N) may include WAM N (114N). The system may include other and/or additional devices and/or components without departing from the invention. The devices and components of the system illustrated in FIG. 1 may be operatively connected via any combinations of wired (e.g., Ethernet) and/or wireless (e.g., WAN) connections without departing from the invention.

In one or more embodiments of the invention, information handling systems (112A, 112N) include the functionality to perform computer implemented actions and/or services. The computer implemented actions and/or services may include any computer implemented functionality without departing from the invention. The computer implemented functionality may include, for example, inference, training for machine learning, implementing in-memory databases, classification, data analysis, data processing, providing services to client devices, serving web content via the Internet, data backup services, etc.

In one or more embodiments of the invention, information handling systems (112A, 112N) are implemented as computing devices. In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments of the invention, WAMs (114A, 114N) include the functionality to generate and update warranty audit tables (WATs) (not shown) based on change events associated with changes to information handling systems (112A, 112N) associated with the WAMs (114A, 114N). One such change may include, for example, recording a differential temperature reading between a system inlet temperature and a system outlet temperature of an information handling system (e.g., 112A) above a threshold differential temperature. Such a change, measured by, for example, temperature sensors located at the inlet and the outlet of the information handling system (e.g., 112A), may indicate that a component is overheating. In one or more embodiments, a WAT is one or more data structures that includes information associated with changes to the information handling system (e.g., 112A) associated with the WAT. The information may include, but not be limited to, what was changed (e.g., a specific component such as a storage device, a temperature change, etc.), a change identifier associated with the change, an event describing the change (e.g., temperature change, component change, etc.) an initial timestamp associated with the first point in time in which the change occurred, a finial timestamp associated with the point in time in when the change was resolved, and log information that describes the change. The WAT may include other and/or additional information without departing from the invention. One non-limiting example of a WAT is shown in FIG. 3B.

In one or more embodiments, WAMs (114A, 114N) further include the functionality to generate exportable WAT data and provide the exportable WAT data to the warranty manager (100). For additional information regarding the functionality of the WAMs (114A, 114N), refer to FIGS. 2A-2B.

In one or more embodiments of the invention, WAMs (114A, 114N) are implemented as computer instructions, e.g., computer code, stored on a persistent storage (not shown) of information handling systems (112A, 112A) that when executed by a processor, hardware controller, or other component of information handling systems (112A, 112N) cause the information handling systems (112A, 112N) to provide the functionality of the WAMs (114A, 114N) described throughout this application.

In one or more embodiments of the invention, the warranty manager (100) includes the functionality to assess warranty claims associated with information handling systems using exportable WAT data obtained from WAMs (114A, 114N). For additional information regarding the functionality of the warranty manager (100) refer to FIG. 2C.

In one or more embodiments of the invention, the warranty manager is implemented using one or more computing devices (described above).

While FIG. 1 shows a configuration of components, other configurations may be used without departing from the scope of embodiments described herein. Accordingly, embodiments disclosed herein should not be limited to the configuration of components shown in FIG. 1.

Figure 2A:
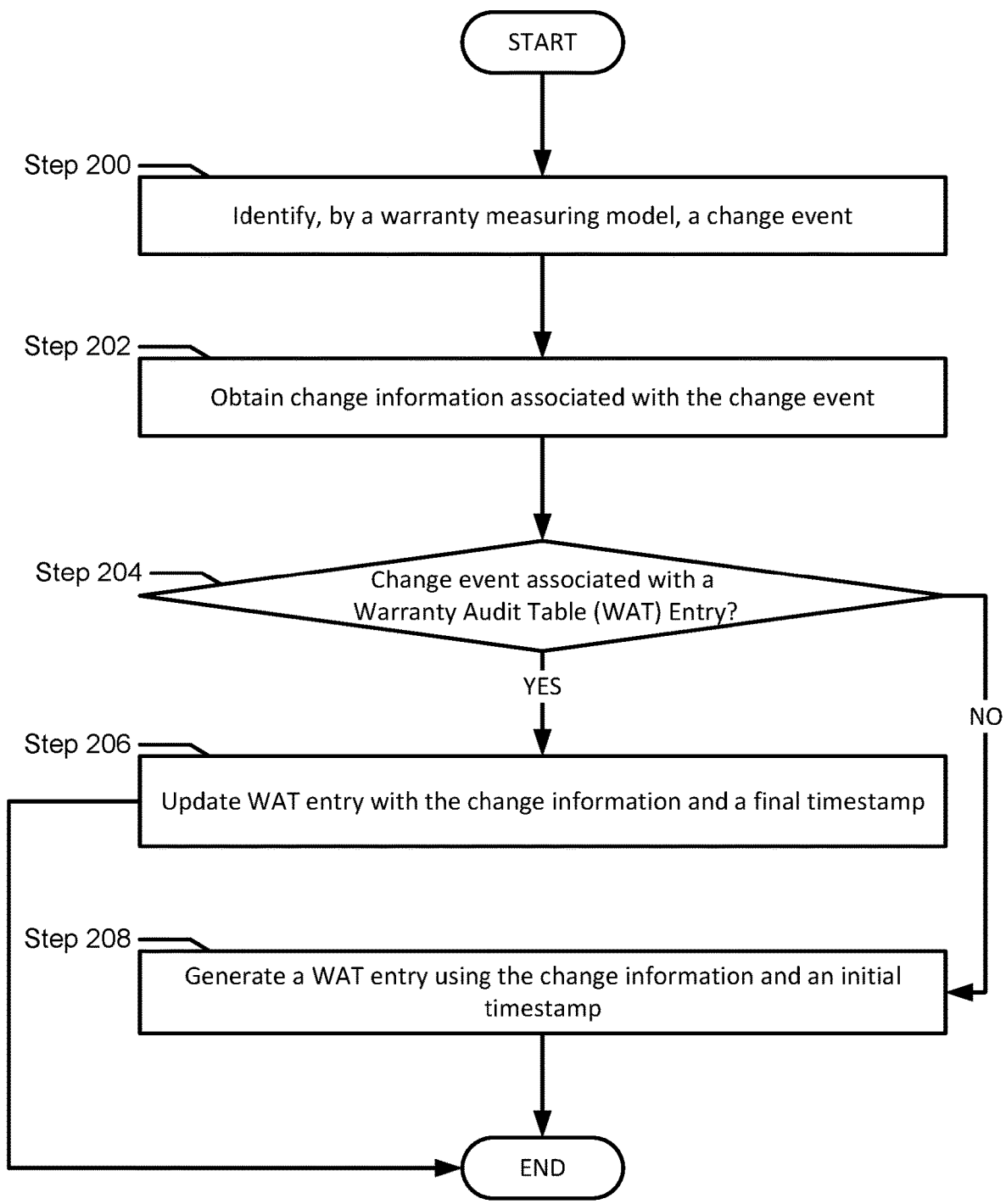
FIG. 2A shows a flowchart in accordance with one or more embodiments of the invention.

FIG. 2A shows a flowchart describing a method for maintaining a warranty audit table WAT in accordance with one or more embodiments of the invention.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a change event is identified by a warranty measuring model (WAM) of an information handling system. The change event may include any change to any component of the information handling system associated with the WAM made by a user of the information handling system without departing from the invention. For example, the change event may include replacing, removing, and/or adding a component (e.g., graphics processing unit, storage disk, network card, etc.) of the information handling system. The change event may include other types of change events without departing from the invention. The WAM may monitor the status of each component of the information handling system and detect changes to the components. The WAM may identify the changes to the components as change events.

In one or more embodiments of the invention, the change event may also include changes to physical conditions of the information handling system such as temperature changes. The information handling system may include temperature sensors that measure the inlet temperature and the outlet temperature of the information handling system. The information handling system may include other and/or additional temperature sensors that measure other and/or additional temperatures associated with the information handling system without departing from the invention. A temperature change may include: (i) measuring a temperature (i.e., at the inlet, at the outlet, and/or a differential temperature between the inlet and the outlet) above an upper temperature threshold, and (ii) measuring a temperature (i.e., at the inlet, at the outlet, and/or a differential temperature between the inlet and the outlet) below a lower temperature threshold. The WAM may monitor the temperature sensor measurements and identify a temperature change as a change event.

In Step 202, change information associated with the change event is obtained by the WAM. The WAM may generate and/or obtain change information associated with the change event in response to identifying the change event. The change information may include, for example, a change, a change identifier, an event, an initial timestamp, a final timestamp, log information, and/or other information associated with the change event.

In one or more embodiments of the invention, the change may specify the particular component and/or temperature that is associated with the change. The change may include a component identifier (i.e., a unique combination of bits associated with a particular component and/or temperature sensor of information handling system) and/or a location (i.e., inlet temperature, outlet temperature, a peripheral component interconnect (PCI) slot number, etc.) associated with the component associated with the change event. The WAM may assign the change to a change event and/or obtain the change from a monitoring entity (not shown in FIG. 1) associated with the information handling system. The change may include other and/or additional information without departing from the invention.

In one or more embodiments of the invention, the change identifier may specify the particular change event. The change identifier may include a unique combination of bits that may be associated with a particular change event. The change identifiers may be used to specify particular change events. The change identifiers may be generated and assigned to change events by the WAM. The change identifier may include other and/or additional information without departing from the invention.

In one or more embodiments of the invention, the event may specify the type of change event. The event may be a string of alphabetic and/or numeric characters that describe the type of change event. The event may specify whether the change event is associated with a component change, temperature change, etc. The event may be generated by the WAM and/or obtained from a monitoring entity (not shown in FIG. 1) associated with the information handling system. The event may include other and/or additional information without departing from the invention.

A change event may be associated with a passage of time. For example, a component change may include a removal of the old component at a first point in time and an addition of the new component at a second point in time. The first point in time may specify when a change event was first identified and the second point in time may specify when the change event was resolved or updated with a related change. In one or more embodiments of the invention, the initial time stamp may be the point in time in which a change event is first identified. The WAM may include and/or otherwise have access to a real-time clock in which it may use to record the point in time in which a change event is first identified. The initial time stamp may include other and/or additional information without departing from the invention. In one or more embodiments of the invention, the final timestamp may be the point in time in which a change event is resolved or updated with a related change. The WAM may include and/or otherwise have access to a real-time clock in which it may use to record the point in time in which a change event is resolved or updated with a related change. The final timestamp may include other and/or additional information without departing from the invention.

In one or more embodiments of the invention, the log information may specify further information associated with the change event. For example, the log information may specify whether a removed component was replaced with a supported or unsupported component (e.g., by comparing the new component with a list of supported components maintained by the WAM), whether a new component is functional, and/or whether a temperature change is above an upper threshold or below a lower threshold. The log information may be generated by the WAM during the monitoring of the components and/or obtained from a monitoring entity (not shown in FIG. 1) associated with the information handling system. The log information may include other and/or additional information associated with the change event without departing from the invention.

In Step 204, a determination is made by the WAM whether the change event is associated with an existing warranty audit table (WAT) entry. The WAM may compare the change information associated with the change event with the existing entries included in the WAT. In one or more embodiments of the invention, if the WAM identifies a WAT entry that includes the change, the change identifier, and the event that matches the change information obtained in Step 202, and if the WAT entry does not include a final timestamp and log information that indicates that the change event was resolved, then the WAM may determine that the change event is associated with an existing WAT entry. In one or more embodiments of the invention, if the WAM does not identify a WAT entry that includes the change, the change identifier, and the event that matches the change information obtained in Step 202, or if the WAT entry includes a final time stamp and log information that indicates that the change event was resolved, then the WAM may determine that the change event is not associated with an existing WAT entry.

For example, the change information obtained in Step 202 may include a change that specifies a graphics processing unit (GPU), a change identifier, and an event that specifies that the GPU is associated with a component change. The change information may further include a timestamp associated with the change event and log information that specifies that the GPU was replaced with a supported and functional component. The WAM may identify a WAT entry that includes the same change that specifies the GPU, the same change identifier, and the same event that specifies that the GPU is associated with a component change. The WAT entry may include an initial timestamp and log information that specifies that the GPU was removed from the information handling system. The WAM may determine that the change event is associated with the existing WAT entry based on the change information obtained in Step 202 and the WAT.

In one or more embodiments of the invention, if the WAM determines that the change event is associated with a warranty audit table (WAT) entry, then the method proceeds to Step 206. In one or more embodiments of the invention, if the if the WAM determines that the change event is not associated with a warranty audit table (WAT) entry, then the method proceeds to Step 208.

In Step 206, the WAM updates the existing WAT entry associated with the change event with the change information and a final timestamp. In one or more embodiments of the invention, the WAM may update the existing WAT entry associated with the change event using the log information and the final timestamp. The WAM may record the timestamp included in the change information as the final timestamp in the existing WAT entry. The WAM may further update the log information included in the existing WAT entry to include the log information of the change information obtained in Step 202. As a result, the updated WAT entry may specify when and how the change associated with the change event was resolved.

In one or more embodiments of the invention, the method may end following Step 206.

In Step 208, the WAM generates a new WAT entry using the change information and an initial timestamp. In one or more embodiments of the invention, the WAM may include the change information obtained in Step 202 to generate a new WAT entry associated with the change event. The WAM may include the timestamp included in the change information as the initial timestamp specify when the change event was first identified. The WAM may specify that the final timestamp is not recorded to indicate that the WAT entry is associated with a change that has yet to be resolved at the point in time the change event was identified.

In one or more embodiments of the invention, the method may end following Step 208.

Figure 2B:
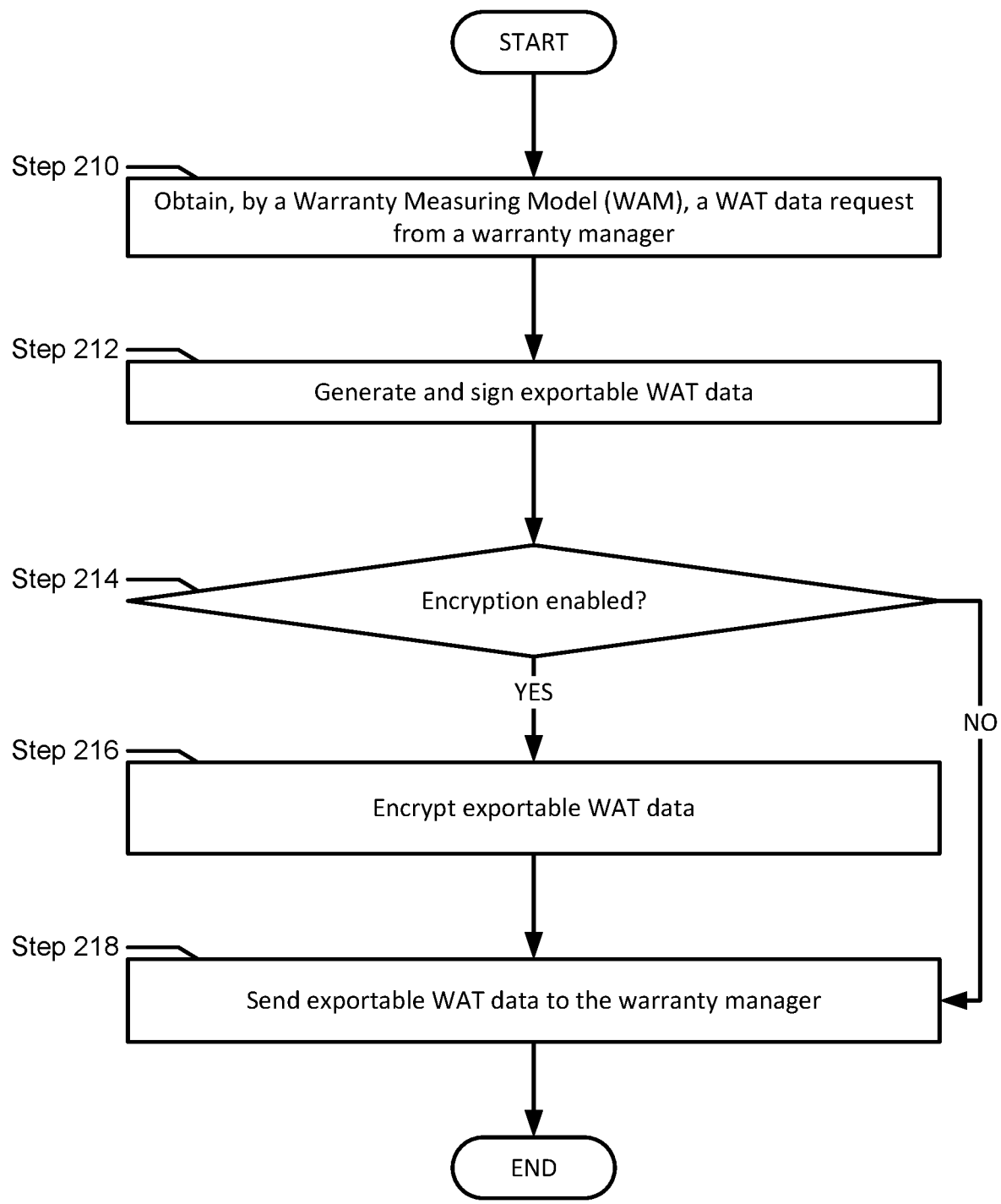
FIG. 2B shows a flowchart in accordance with one or more embodiments of the invention.

FIG. 2B shows a flowchart describing a method for generating exportable WAT data in accordance with one or more embodiments of the invention.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 210, a WAT data request from a warranty manager is obtained by a warranty measuring model (WAM) of an information handling system. In one or more embodiments, the WAT data request is provided to the WAM using any appropriate method of data transmission without departing from the invention. As an example, the warranty manager may communicate the WAT data request as network data traffic units over a series of network devices that operatively connect to the WAM and the warranty manager. As another example, the warranty manager may send an application programming interface (API) call to the WAM that includes a request for WAT data.

In Step 212, the exportable WAT data is generated and signed by the WAM. In one or more embodiments of the invention, the WAM generates exportable WAT data by transforming the WAT entries into a data format that may be efficiently processed by the warranty manager. As an example, the WAM may transform the WAT from a text-based table into an image format that depicts information using image data that may be processed by image processing engines executing on the warranty manager to efficiently process the exportable WAT data. The WAM may transform the WAT data into any data format that may be efficiently processed by the warranty manager without departing from the invention.

In one or more embodiments of the invention, the WAM may sign the exportable WAT data to generate a signature. The WAM may sign the exportable WAT data using an encryption key associated with the WAM and any signature generation algorithm, such as the digital signature algorithm, without departing from the invention. As a result, the warranty manager may authenticate the exportable WAT data using the signature to verify that the exportable WAT data is from the WAM and has not been tampered with by other entities.

In Step 214, a determination is made as to whether encryption of the exportable WAT data is enabled. In one or more embodiments of the invention, the WAT data request may include a specification to encrypt the exportable WAT data. In one or more embodiments of the invention, the WAM may include an encryption flag. When set, the encryption flag may indicate that the exportable WAT data is to be encrypted. When not set, the encryption flag may indicate that the exportable WAT data is not to be encrypted. The manufacturer of the information handling system and/or the user of the information handling system may set the encryption flag.

In one or more embodiments of the invention, if the WAM identifies that the WAT data requests specifies that encryption of the exportable WAT data is enabled or that the WAM includes information such as an encryption flag that indicates that the exportable WAT data is to be encrypted, then the WAM may determine that encryption for the exportable WAT data is enabled. In one or more embodiments of the invention, if the WAM identifies that the WAT data requests does not specify that encryption of the exportable WAT data is enabled and that the WAM does not include information such as an encryption flag that indicates that the exportable WAT data is to be encrypted, then the WAM may determine that encryption for the exportable WAT data is not enabled.

In one or more embodiments of the invention, if the WAM determines that encryption of exportable WAT data is enabled, then the method proceeds to Step 216. In one or more embodiments of the invention, if the WAM determines that encryption of exportable WAT data is not enabled, then the method proceeds to Step 218.

In Step 216, the exportable WAT data is encrypted by the WAM. In one or more embodiments of the invention, the exportable WAT data is encrypted using any appropriate method of data encryption without departing from the invention. For example, the WAM may encrypt the exportable WAT data using public-key encryption. Such encryption methods may include using a public key associated with the WAM and a cryptographic algorithm to generate encrypted data that may be decrypted by the warranty manager and an associated private key. As a result, the encrypted exportable WAT data may be securely transmitted to the warranty manager.

In Step 218, the exportable WAT data is sent by the WAM to the warranty data manager. In one or more embodiments, the exportable WAT data is provided to the warranty manager using any appropriate method of data transmission without departing from the invention. As an example, the WAM may communicate the exportable WAT data to the warranty manager as network data traffic units over a series of network devices that operatively connected to the WAM and the warranty manager.

In one or more embodiments of the invention, the method may end following step 218.

Figure 2C:
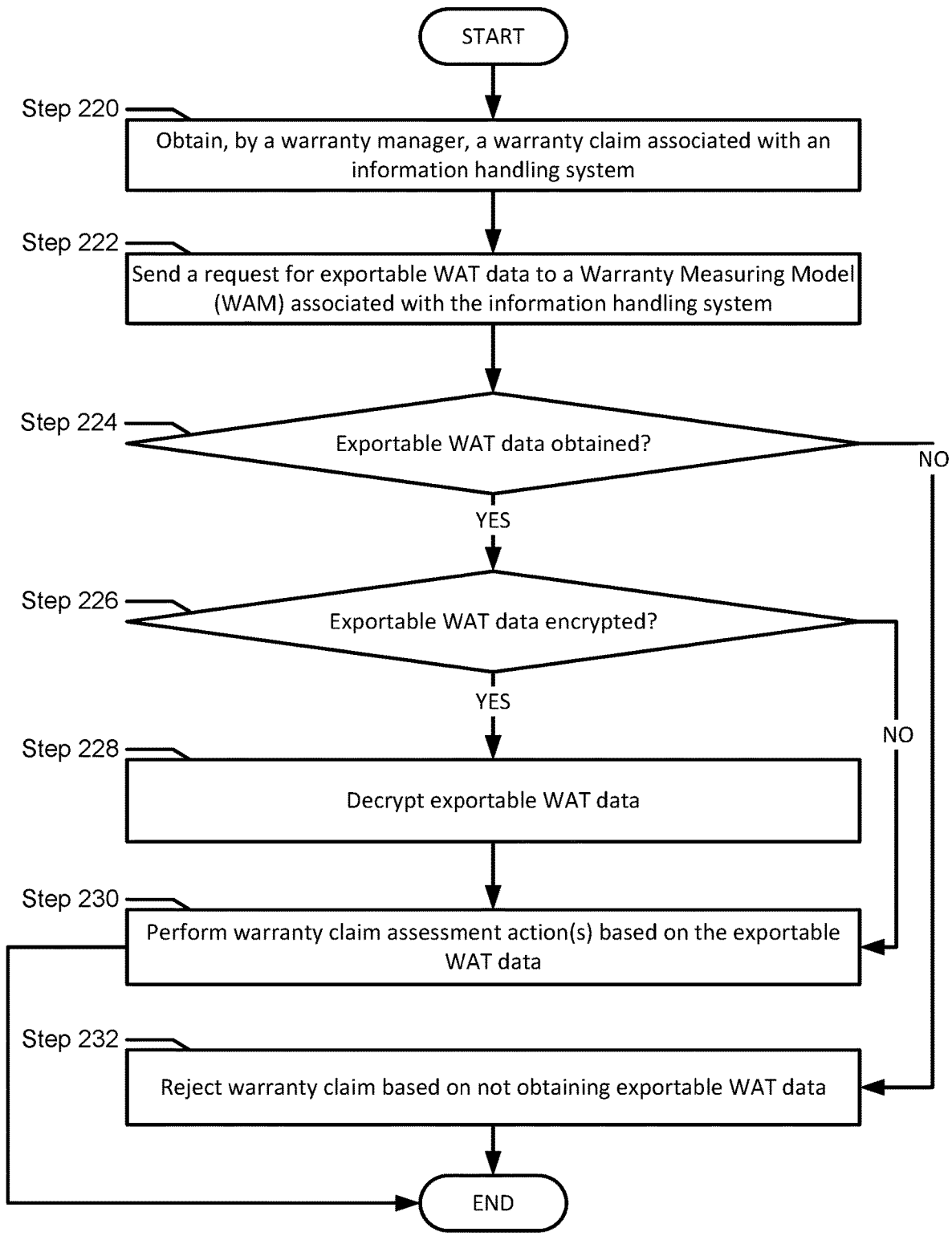
FIG. 2C shows a flowchart in accordance with one or more embodiments of the invention.

FIG. 2C shows a flowchart describing a method for assessing warranty claims using exportable WAT data in accordance with one or more embodiments of the invention.

While the various steps in the flowchart shown in FIG. 2C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, a warranty claim associated with an information handling system is obtained by a warranty manager. In one or more embodiments of the invention, a user of an information handling system submits the warranty claim. The warranty claim may refer to a data structure that includes a request to replace all and/or a portion of the information handling system as specified by a warranty associated with the information handling system. In one or more embodiments of the invention, the warranty claim may be provided to the warranty manager using any appropriate method of data transmission without departing from the invention. As an example, a user may initiate the communication of the warranty claim through the information handling system to the warranty manager as network data traffic units over a series of network devices that operatively connected to the information handling system and the warranty manager.

In Step 222, a request for exportable WAT data is sent by the warranty manager to a warranty measuring model (WAM) associated with the information handling system. In one or more embodiments of the invention, the warranty claim may specify the information handling system and/or the WAM associated with the information handling system. The warranty manager may send a request for exportable WAT data to the WAM associated with the information handling system. In one or more embodiments, the exportable WAT data request is provided to the WAM using any appropriate method of data transmission without departing from the invention. As an example, the warranty manager may communicate the WAT data request as network data traffic units over a series of network devices that operatively connected to the WAM and the warranty manager. As another example, the warranty manager may send an API call to the WAM that includes a request for WAT data.

In Step 224, a determination is made, by the warranty manager, as to whether exportable WAT data is obtained in response to the request transmitted in Step 222. In one or more embodiments of the invention, the warranty manager may wait a predetermined amount of time for the exportable WAT data. The user of the information handling system may refuse to provide such data, corrupt the WAM included in the information handling system, and/or otherwise prevent the warranty manager for obtaining the exportable WAT data from the WAM associated with the information handling system. In one or more embodiments of the invention, if the warranty manager obtains the exportable WAT data, the warranty manager may determine that the exportable WAT data is obtained in response to the request transmitted in Step 222. In one or more embodiments of the invention, if the predetermined amount of time has passed since the request for the exportable WAT data was sent, then the warranty manager may determine that the exportable WAT data was not obtained in response to the request transmitted in Step 222.

In one or more embodiments of the invention, if the warranty manager determines that exportable WAT data is not obtained, then the method proceeds to Step 232. In one or more embodiments of the invention, if the warranty manager determines that the exportable WAT data is obtained, then the method proceeds to Step 226.

In Step 226, a determination is made as to whether the exportable WAT data is encrypted. In one or more embodiments of the invention, the WAM may encrypt the exportable WAT data prior to transmitting the exportable WAT data to ensure that the exportable WAT data is secure. The encrypted exportable WAT data may be unreadable to the warranty manager without first decrypting the encrypted exportable WAT data. In one or more embodiments of the invention, if the exportable WAT data is in a form which is unreadable by the warranty manager, then the warranty manager may determine that the exportable WAT data is encrypted. In one or more embodiments of the invention, if the exportable WAT data is in a form which is readable by the warranty manager, then the warranty manager may determine that the exportable WAT data is not encrypted.

In one or more embodiments of the invention, if the warranty manager determines that the exportable WAT data is encrypted, then the method proceeds to Step 228. In one or more embodiments of the invention, if the warranty manager determines that the exportable WAT data is not encrypted, then the method proceeds to Step 230.

In Step 228, the exportable WAT data is decrypted by the warranty manager. In one or more embodiments of the invention, the exportable WAT data is decrypted using any appropriate method of data decryption without departing from the invention. For example, the warranty manager may decrypt the exportable WAT data using public-key encryption. Such encryption methods may include using a private key possessed only by the warranty manager and a cryptographic algorithm to generate decrypted exportable WAT data. As a result, the decrypted exportable WAT data may be transformed into a form readable by the warranty manager.

In Step 230, warranty claim assessment action(s) are performed by the warranty manager based on the exportable WAT data. In one or more embodiments of the invention, the warranty claim assessment actions may include any number of actions taken by the warranty manager to resolve the warranty claim. The warranty claim assessment actions may include, for example, accepting the warranty claim, rejecting the warranty claim, providing the exportable WAT data to a user of the warranty manager for further processing, and/or requesting additional information from the user that submitted the warranty claim. The warranty claim assessment actions may include other and/or additional actions performed to resolve the warranty claim based on the exportable WAT data without departing from the invention.

For example, if the exportable WAT data indicates that a component of the information handling system was replaced with an unsupported component, the warranty manager may reject the warranty claim without requiring the performance of any additional warranty claim assessment actions.

In one or more embodiments of the invention, the method may end following Step 230.

In Step 232, the warranty claim is rejected by the warranty manager based on not obtaining the exportable WAT data. In one or more embodiments of the invention, the warranty manager may automatically reject the warranty claim if the exportable WAT data is not provided to the warranty manager before the expiration of the predetermined amount of time from when the request for exportable WAT data was sent to the WAM. In one or more embodiments of the invention, rejecting a warranty claim may include notifying the user that submitted the warranty claim that the warranty claim was rejected.

In one or more embodiments of the invention, the method may end following Step 232.

EXAMPLE

Figure 3A:
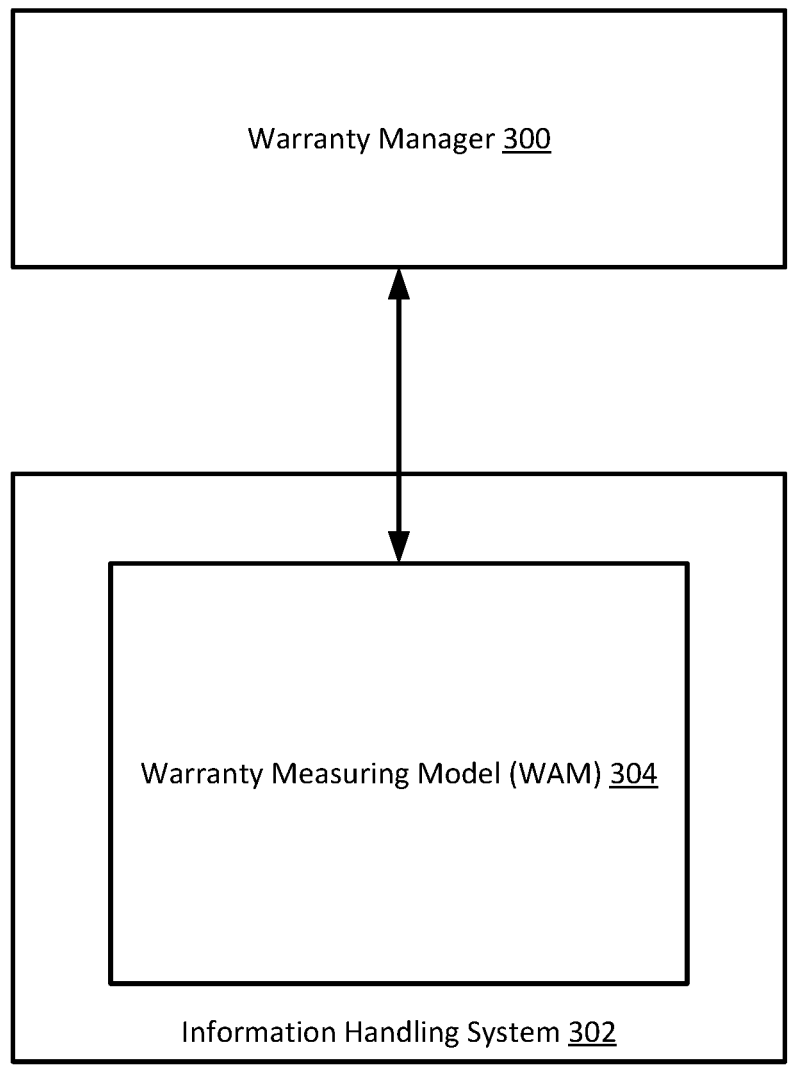

FIGS. 3A-3C show an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein.

Referring to FIG. 3A, consider a scenario in which a customer desires to train a machine learning model using the customer's own data. As a result, the customer obtains an information handling system configured to process and store data in a manner that is relevant for training a machine learning model. The information handling system comes with a warranty that covers parts and labor costs associated with the repair or replacement of the information handling system in the event that issues arise with the functionality of the information handling system. However, the warranty does not cover all possible scenarios. As an example, changes made by the customer to the information handling system, operating conditions of the information handling system, etc. may cause the warranty to be voided, and, accordingly, claims made pursuant to the warranty may be rejected. The customer uses the information handling system to train the machine learning model. After the machine learning model is trained, the customer uses the information handling system to execute the machine learning model. During such execution, the performance of the information handling system is worse than what the customer expects. For example, the performance may be below certain criteria agreed to by the manufacturer of the information handling system and the customer, and set forth in a service level agreement. Based on the perceived subpar performance of the information handling system, the customer may submit a warranty claim to the manufacturer of the information handling system in order to attempt to replace or repair the information handling system.

In such a scenario, the customer obtains the information handling system (302) from the manufacturer, along with a warranty for the information handling system. The information handling system includes a warranty measuring model (WAM) (304) included in a hardware controller of the information handling system (302). The WAM is operatively connected to a warranty manager (300) that processes warranty claims.

After obtaining the information handling system (302), the customer begins executing the machine learning model using the information handling system (302). At 09:00:00 on 03-20-2021, the customer removes a disk (e.g., a solid state disk) originally included in the information handling system (302). The WAM (304) identifies the removal of the disk as a first change event and obtains change information associated with the first change event. The change information is obtained from a log component of the information handling system. The change information specifies (i) the disk that was removed, (ii) a change identifier, change identifier A, associated with the first change event, (iii) the event, a component change, (iv) an initial timestamp associated with the first change event, and (v) log information associated with the first change event, a component was removed. The WAM (304) determines that the change event is not associated with a previous warranty audit table (WAT) entry and uses the change information to generate a WAT entry. The example WAT (310) illustrated in FIG. 3B includes the WAT entry, (i.e., the second row from the top). Each row, excluding the top row, includes a WAT entry. The top row includes headers of the columns of the example WAT (310). The headers include; change (312), change identifier (314), event (316), initial timestamp (318), final timestamp (320), and log information (322). Each column associated with the header includes that type of information. For example the first column, change (312), includes components and/or conditions that experienced a change. The first WAT entry includes the change information associated with the first change event: the change (312) was disk A (located in slot A of the information handling system (302)) (324), the change identifier is change identifier A (326), the event is component change (328), the initial timestamp is 09:00:00 on 03-20-2021 (330) and the final timestamp and the log information are not updated at this time as disk A has not been replaced.

At 10:00:00 on 03-20-2021, the customer replaces the disk originally included in the information handling system (302). The WAM (304) identifies the replacement of the disk as a second change event and obtains change information associated with the first change event. The change information is obtained from a log component of the information handling system. The change information specifies (i) the disk that was replaced, (ii) a change identifier associated with the disk, change identifier A, associated with the first change event, (iii) the event, a component change, (iv) an final timestamp associated with the second change event, and (v) log information associated with the second change event, the disk is supported and functional. The WAM (304) determines that the second change event is associated with the first WAT entry and uses the change information to update the first WAT entry. The example WAT (310) illustrated in FIG. 3B includes the updated WAT entry, (i.e., the second row from the top). The first WAT entry now includes final timestamp of 10:00:00 on 03-20-2021 (332) and updated log information of supported and functional component (334).

At 10:00:00 on 03-20-2021, the customer removes a second disk originally included in the information handling system (302). The WAM (304) identifies the removal of the disk as a third change event and obtains change information associated with the third change event. The change information is obtained from a log component of the information handling system. The change information specifies (i) the disk that was removed, (ii) a change identifier associated with the disk, change identifier B, associated with the third change event, (iii) the event, a component change, and (iv) an initial timestamp associated with the third change event. The WAM (304) determines that the third change event is not associated with a WAT entry and uses the change information to generate a second WAT entry. The example WAT (310) illustrated in FIG. 3B includes the second WAT entry, (i.e., the third row from the top). The second WAT entry includes the change information associated with the third change event: the change (312) was disk B (located in slot B of the information handling system (302)) (336), the change identifier is change identifier B (338), the event is component change (340), the initial timestamp is 10:00:00 on 03-20-2021 (342) and the final timestamp and the log information are not updated at this time as disk B was not replaced.

At 11:00:00 on 03-20-2021, the customer replaces the second disk originally included in the information handling system (302). The WAM (304) identifies the replacement of the disk as a fourth change event and obtains change information associated with the fourth change event. The change information is obtained from a log component of the information handling system. The change information specifies (i) the disk that was replaced, (ii) a change identifier associated with the disk, change identifier B, associated with the third change event, (iii) the event, a component change, (iv) a final timestamp associated with the fourth change event, and (v) log information associated with the fourth change event, the disk is unsupported and functional. The WAM (304) determines that the fourth change event is associated with the second WAT entry and uses the change information to update the second WAT entry. The example WAT (310) illustrated in FIG. 3B includes the updated WAT entry, (i.e., the third row from the top). The second WAT entry now includes final timestamp of 11:00:00 on 03-20-2021 (344) and updated log information of unsupported and functional component (346).

At 11:00:00 on 03-20-2021, the customer removes a graphics processing unit originally included in the information handling system (302). The WAM (304) identifies the removal of the graphics processing unit as a fifth change event and obtains change information associated with the fifth change event. The change information is obtained from a log component of the information handling system. The change information specifies (i) the graphics processing unit that was removed, (ii) a change identifier associated with the graphics processing unit, change identifier C, associated with the fifth change event, (iii) the event, a component change, (iv) an initial timestamp associated with the fifth change event, and (v) log information, undetected component. The WAM (304) determines that the fifth change event is not associated with a WAT entry and uses the change information to generate a third WAT entry. The example WAT (310) illustrated in FIG. 3B includes the third WAT entry, (i.e., the fourth row from the top). The third WAT entry includes the change information associated with the fifth change event: the change (312) was graphics processing unit (located in slot C of the information handling system (302)) (348), the change identifier is change identifier C (350), the event is component change (352), the initial timestamp is 11:00:00 on 03-20-2021 (354) and the final timestamp not recorded (356) at this time as the graphics processing unit was not replaced, and the log information specifies an undetected component (358).

At 12:00:00 on 03-20-2021, a system inlet temperature sensor included in the information handling system (302) recorded a temperature above a threshold. The WAM (304) identifies the record of the inlet temperature above a threshold as a sixth change event and obtains change information associated with the sixth change event. The change information is obtained from a log component of the information handling system. The change information specifies (i) the system inlet temperature was recorded at above a threshold temperature, (ii) a change identifier associated with the system inlet temperature, change identifier D, associated with the fifth change event, (iii) the event, a temperature change, (iv) an initial timestamp associated with the sixth change event, and (v) log information associated with the sixth change event, the temperature above a threshold. The WAM (304) determines that the sixth change event is not associated with a WAT entry and uses the change information to generate the fourth WAT entry. The example WAT (310) illustrated in FIG. 3B includes the fourth WAT entry, (i.e., the fifth row from the top). The fourth WAT entry includes the change information associated with the fifth change event: the change (312) was system inlet temperature of the information handling system (302) (360), the change identifier is change identifier D (362), the event is temperature change (364), the initial timestamp is 12:00:00 on 03-20-2021 (366) and the final timestamp is not recorded (368) at this time as system inlet temperature was still above the threshold, and the log information specifies temperature above a threshold (370).

At 13:00:00 on 03-20-2021, the system inlet temperature of the information handling system (302) drops below the threshold temperature. The WAM (304) identifies the system inlet temperature change as the seventh change event and obtains change information associated with the seventh change event. The change information is obtained from a log component of the information handling system. The change information specifies (i) the system inlet temperature returned to below the threshold, (ii) a change identifier associated with the disk, change identifier D, associated with the sixth change event, (iii) the event, a temperature change, (iv) and a final timestamp associated with the seventh change event. The WAM (304) determines that the seventh change event is associated with the fourth WAT entry and uses the change information to update the fourth WAT entry. The example WAT (310) illustrated in FIG. 3B includes the updated WAT entry, (i.e., the fifth row from the top). The fourth WAT entry now includes final timestamp of 13:00:00 on 03-20-2021 (368).

At 13:00:00 on 03-20-2021, a system outlet temperature sensor included in the information handling system (302) recorded a temperature below a lower threshold. The WAM (304) identifies the record of the outlet temperature above a threshold as an eighth change event and obtains change information associated with the eighth change event. The change information is obtained from a log component of the information handling system. The change information specifies (i) the system outlet temperature was recorded at below a lower threshold temperature, (ii) a change identifier associated with the disk, change identifier E, associated with the eighth change event, (iii) the event, a temperature change, (iv) an initial timestamp associated with the eighth change event, and (v) log information associated with the eighth change event, the temperature below a threshold. The WAM (304) determines that the eighth change event is not associated with a WAT entry and uses the change information to generate the fifth WAT entry. The example WAT (310) illustrated in FIG. 3B includes the fifth WAT entry, (i.e., the sixth row from the top). The fifth WAT entry includes the change information associated with the eighth change event: the change (312) was system outlet temperature of the information handling system (302) (372), the change identifier is change identifier E (374), the event is temperature change (376), the initial timestamp is 13:00:00 on 03-20-2021 (378) and the final timestamp is not recorded (380) at this time as the system outlet temperature was still below the lower threshold, and the log information specifies temperature below a threshold (382).

At 14:00:00 on 03-20-2021, the system outlet temperature of the information handling system (302) raises above the lower threshold temperature. The WAM (304) identifies the system outlet temperature change as the ninth change event and obtains change information associated with the ninth change event. The change information is obtained from a log component of the information handling system. The change information specifies (i) the system outlet temperature returned to above the lower threshold, (ii) a change identifier associated with the disk, change identifier E, associated with the eighth change event, (iii) the event, a temperature change, (iv) and a final timestamp associated with the ninth change event. The WAM (304) determines that the ninth change event is associated with the fifth WAT entry and uses the change information to update the fifth WAT entry. The example WAT (310) illustrated in FIG. 3B includes the updated WAT entry, (i.e., the sixth row from the top). The fifth WAT entry now includes final timestamp of 14:00:00 on 03-20-2021 (380).

At this point in time, the customer perceives that the information handling system's performance is worse than the customer expected. Therefore, the customer submits a warranty claim associated with the information handling system to the warranty manager (300). In response to obtaining the warranty claim, the warranty manager (300) sends a request for exportable WAT data to the WAM (304). After obtaining the request for the exportable WAT table, the WAM (304) generates and signs the exportable WAT data. The WAM (304) then determines that encryption is not enabled and therefore sends the unencrypted exportable WAT data to the warranty manager (300).

FIG. 3C shows an example of the exportable WAT data (311). The exportable WAT data (311) is generated in an image format that enables warranty manager to efficiently process the exportable WAT data using an image processing engine. As shown in FIG. 3C, the bottom row of the exportable WAT data (311) comprises the headers for the columns. The leftmost column, time (313), shows time periods, where time is moving forward as you ascend the exportable WAT data including 03-20-2021 08:00:00-09:00:00 (325), 03-20-2021 09:00:00-10:00:00 (327), 03-20-2021 10:00:00-119:00:00 (329), 03-20-2021 11:00:00-12:00:00 (331), 03-20-2021 12:00:00-13:00:00 (333), and 03-20-2021 13:00:00-14:00:00 (335). The next column from the left includes changes to Disk A (slot A) (315), followed by changes to Disk B (slot B) (317), then graphics processing unit (slot C) (319), then system inlet temperature (321), and finally, the rightmost column includes changes to the system outlet temperature (323). Different patterns denote the types of changes that occurred to the components at a particular time period. The first pattern, diagonal lines slanting up and to the right (i.e., the pattern in the disk A (315) column) denote a supported and functional component change. The second pattern, squares (i.e., the pattern in the disk B (317) column) denote an unsupported and functional component change. The third pattern, diamonds (i.e., the pattern in the graphics processing unit (319) column) denote an undetected or removed component. The fourth pattern, diagonal lines slanting down and to the left (i.e., the pattern in the system inlet temperature (321) column) denote a temperature change above an upper threshold temperature. The fifth pattern, dots (i.e., the pattern in the system outlet temperature (323) column) denote a temperature change below a lower threshold temperature.

After obtaining the exportable WAT data (311), the warranty manager (300) uses an image processing engine to process the exportable WAT data (311). Based on the processing of the exportable WAT data (311), the warranty manager (311) determines that the customer changed an original component of the information handling system (302) with and unsupported component. Based on this identification, the warranty manager (300) rejects the warranty claim submitted by the customer without requiring review from a user of the warranty manager.

End of Example

In the above example, the WAM was used to automatically record changes and information associated with changes to components of an information handling system that may be pertinent in a WAT to determining whether a warranty claim associated with the information handling system is to be accepted or rejected. Once a warranty claim is submitted by the user of the information handling system, the warranty manager obtains exportable WAT data from the WAM and uses the exportable WAT data to determine whether to accept and/or reject the warranty claim. As such, warranty claims may be efficiently processed by a warranty manager while mitigating tampering of information that may be pertinent to resolving warranty claims by a user.

Figure 4:
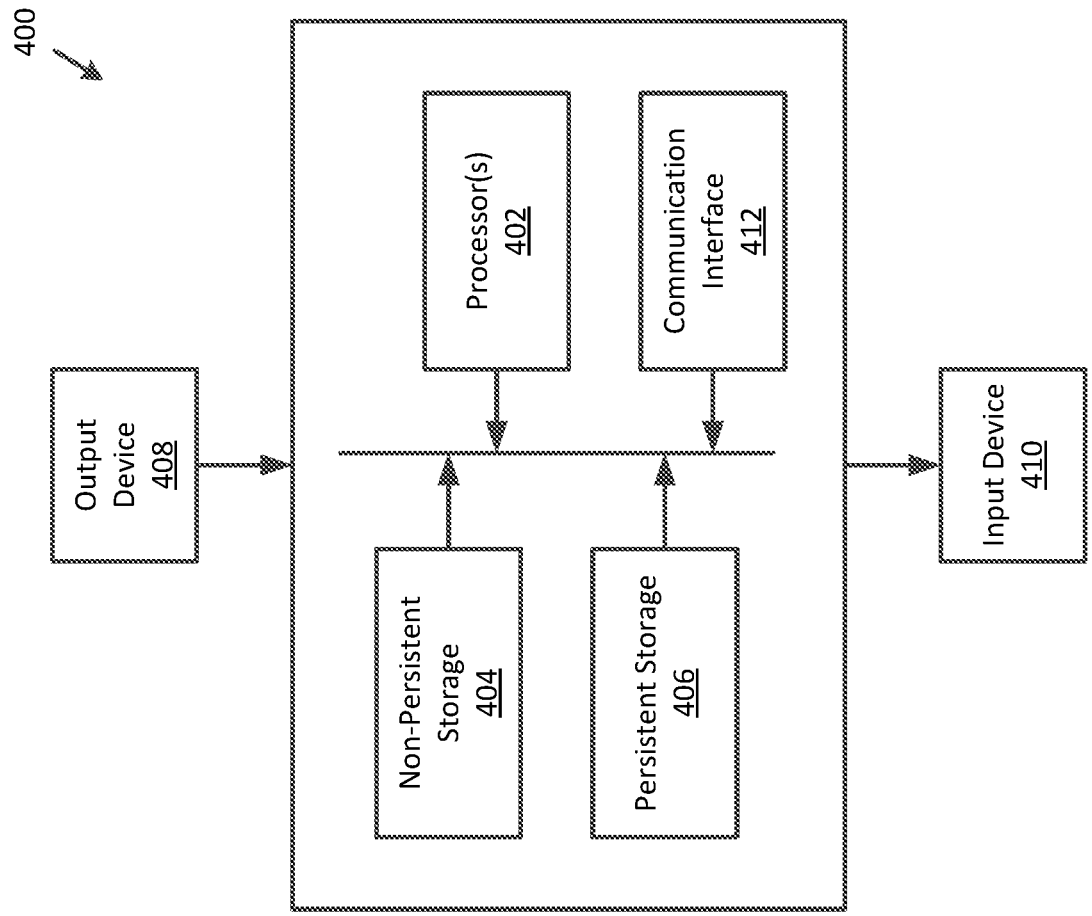
FIG. 4 shows a computing system in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments described herein use a WAM to automatically maintain and update a WAT that may be used to track changes to the information handling systems and includes information regarding the aforementioned changes. The WAM may operate in a manner that may not be tampered with by a user of the information handling system, thereby increasing the security of the WAT data. In one or more embodiments, the WAT data may be exported into data formats that are efficiently processed by a warranty manager and provided to the warranty manager. The exportable WAT data may also be encrypted to further increase the security of the exportable WAT data. By using a WAM to maintain a WAT and provide exportable WAT data to a warranty manager, warranty claims may be, efficiently, accurately and reliably resolved while mitigating any tampering with the WAT data.

The problems discussed above should be understood as being examples of problems solved by embodiments of the invention, and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing warranty claims associated with computing devices, the method comprising:
   identifying, by a warranty measuring model executed by a computing device, a first change event of change events associated with the computing device, wherein the change events comprise adding, removing, and replacing a hardware component of hardware components of the computing device through monitoring of the hardware components by the warranty measuring model;
   in response to identifying the first change event:
      obtaining first change information associated with the first change event, wherein obtaining the first change information comprises generating the first change information by the warranty measuring model through the monitoring;
      making a first determination that the first change event is not associated with an entry of a warranty audit table (WAT); and
      in response to the first determination:
         generating a new WAT entry in the WAT using the first change information and an initial timestamp;
         identifying, by the warranty measuring model, a second change event of the change events associated with the computing device;
         in response to identifying the second change event:
            obtaining second change information associated with the second change event;
            making a second determination that the second change event is associated with an existing WAT entry of the WAT; and
            in response to the second determination:
               updating the existing WAT entry using the second change information and a final timestamp.

2. The method of claim 1, wherein the change events further comprise:
   a temperature reading of the computing device above an upper threshold temperature;
   a temperature reading of the computing device below a lower threshold temperature; and
   a differential temperature reading greater than a differential threshold temperature, wherein the differential temperature comprises a difference between an inlet temperature and an outlet temperature of the computing device.

3. The method of claim 1, wherein the existing WAT entry comprises one selected from a group consisting of:
   the new WAT entry; and
   a WAT entry other than the new WAT entry.

4. The method of claim 1, the method further comprising:
   after updating the existing WAT entry using the second change information and the final timestamp:
      obtaining, by the warranty measuring model, a WAT data request from a warranty manager;
      in response to obtaining the WAT data request;
         generating exportable WAT data using the WAT;
         making a third determination that the exportable WAT data is to be encrypted; and
         in response to the third determination:
            encrypting the exportable WAT data; and
            sending the exportable WAT data to the warranty manager.

5. The method of claim 4, wherein the exportable WAT data comprises a signature used to authenticate that the exportable WAT data originated from the warranty measuring model.

6. The method of claim 4, wherein the exportable WAT data is configured for processing by an image processing engine.

7. The method of claim 4, the method further comprising:
   before the obtaining, by the warranty measuring model, the WAT data request from the warranty manager:
      obtaining, by the warranty manager, a warranty claim associated with the computing device; and
      sending the WAT data request to the warranty measuring model.

8. The method of claim 7, the method further comprising:
   after sending, by the warranty measuring model, the exportable WAT data to the warranty manager:
      making, by the warranty manager, a fourth determination that the exportable WAT data is obtained; and
      in response to fourth determination:
         performing a warranty claim assessment action based on the exportable WAT data.

9. A non-transitory computer readable medium comprising computer readable program code, which when executed by a computer processor enables the computer processor to perform a method for managing warranty claims associated with computing devices, the method comprising:
   identifying, by a warranty measuring model executed by a computing device, a first change event of change events associated with the computing device, wherein the change events comprise adding, removing, and replacing a hardware component of hardware components of the computing device through monitoring of the hardware components by the warranty measuring model;
   in response to identifying the first change event:
      obtaining first change information associated with the first change event, wherein obtaining the first change information comprises generating the first change information by the warranty measuring model through the monitoring;
      making a first determination that the first change event is not associated with an entry of a warranty audit table (WAT); and
      in response to the first determination:
         generating a new WAT entry in the WAT using the first change information and an initial timestamp;
         identifying, by the warranty measuring model, a second change event of the change events associated with the computing device;

in response to identifying the second change event:
   obtaining second change information associated with the second change event;
   making a second determination that the second change event is associated with an existing WAT entry of the WAT; and
   in response to the second determination:
      updating the existing WAT entry using the second change information and a final timestamp.

10. The non-transitory computer readable medium of claim 9, wherein the change events further comprise:
   a temperature reading of the computing device above an upper threshold temperature;
   a temperature reading of the computing device below a lower threshold temperature; and
   a differential temperature reading greater than a differential threshold temperature, wherein the differential temperature comprises a difference between an inlet temperature and an outlet temperature of the computing device.

11. The non-transitory computer readable medium of claim 9, wherein the existing WAT entry comprises one selected from a group consisting of:
   the new WAT entry; and
   a WAT entry other than the new WAT entry.

12. The non-transitory computer readable medium of claim 9, wherein the method further comprises:
   after updating the existing WAT entry using the second change information and the final timestamp:
      obtaining, by the warranty measuring model, a WAT data request from a warranty manager;
      in response to obtaining the WAT data request;
      generating exportable WAT data using the WAT;
      making a third determination that the exportable WAT data is to be encrypted; and
      in response to the third determination:
         encrypting the exportable WAT data; and
         sending the exportable WAT data to the warranty manager.

13. The non-transitory computer readable medium of claim 12, wherein the exportable WAT data comprises a signature used to authenticate that the exportable WAT data originated from the warranty measuring model.

14. The non-transitory computer readable medium of claim 12, wherein the exportable WAT data is configured for processing by an image processing engine.

15. The non-transitory computer readable medium of claim 12, wherein the method further comprises:
   before the obtaining, by the warranty measuring model, the WAT data request from the warranty manager:
      obtaining, by the warranty manager, a warranty claim associated with the computing device; and
      sending the WAT data request to the warranty measuring model.

16. The non-transitory computer readable medium of claim 15, wherein the method further comprises:
   after sending, by the warranty measuring model, the exportable WAT data to the warranty manager:
      making, by the warranty manager, a fourth determination that the exportable WAT data is obtained; and
      in response to fourth determination:
         performing a warranty claim assessment action based on the exportable WAT data.

17. A system for managing warranty claims associated with information handling systems, the system comprising:
   a computing device comprising processor and memory, and configured to execute a warranty measuring model to:
      identify a first change event of change events associated with the computing device, wherein the change events comprise adding, removing, and replacing a hardware component of hardware components of the computing device through monitoring of the hardware components by the warranty measuring model;
      in response to identifying the first change event:
         obtain first change information associated with the first change event, wherein obtaining the first change information comprises generating the first change information by the warranty measuring model through the monitoring;
         make a first determination that the first change event is not associated with an entry of a warranty audit table (WAT); and
         in response to the first determination:
            generate a new WAT entry in the WAT using the first change information and an initial timestamp;
            identify a second change event of the change events associated with the computing device;
            in response to identifying the second change event:
               obtain second change information associated with the second change event;
               make a second determination that the second change event is associated with an existing WAT entry of the WAT; and
               in response to the second determination:
                  update the existing WAT entry using the second change information and a final timestamp.

18. The system of claim 17, wherein the change events further comprise:
   a temperature reading of the computing device above an upper threshold temperature;
   a temperature reading of the computing device below a lower threshold temperature; and
   a differential temperature reading greater than a differential threshold temperature, wherein the differential temperature comprises a difference between an inlet temperature and an outlet temperature of the computing device.

19. The system of claim 17, wherein the existing WAT entry comprises one selected from a group consisting of:
   the new WAT entry; and
   a WAT entry other than the new WAT entry.

20. The system of claim 17, wherein the warranty measuring model is further configured to:
   after updating the existing WAT entry using the second change information and the final timestamp:
      obtain a WAT data request from a warranty manager;
      in response to obtaining the WAT data request;
      generate exportable WAT data using the WAT;
      make a third determination that the exportable WAT data is to be encrypted; and
      in response to the third determination:
         encrypt the exportable WAT data; and
         send the exportable WAT data to the warranty manager.

* * * * *